(12) United States Patent
Yonemura

(10) Patent No.: US 9,904,123 B2
(45) Date of Patent: *Feb. 27, 2018

(54) LIQUID CRYSTAL DISPLAY PANEL AND LIQUID CRYSTAL DISPLAY DEVICE

(71) Applicant: Mitsubishi Electric Corporation, Chiyoda-ku (JP)

(72) Inventor: Koji Yonemura, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/269,300

(22) Filed: Sep. 19, 2016

(65) Prior Publication Data

US 2017/0003558 A1 Jan. 5, 2017

Related U.S. Application Data

(63) Continuation of application No. 13/251,613, filed on Oct. 3, 2011, now Pat. No. 9,448,443.

(30) Foreign Application Priority Data

Nov. 25, 2010 (JP) .................................. 2010-261948

(51) Int. Cl.
G02F 1/1335 (2006.01)
G02F 1/1343 (2006.01)
(Continued)

(52) U.S. Cl.
CPC ...... *G02F 1/134309* (2013.01); *G02F 1/1339* (2013.01); *G02F 1/1368* (2013.01);
(Continued)

(58) Field of Classification Search
CPC ... G02F 1/133512; G02F 2001/134318; G02F 2001/134372; G02F 1/136286; G02F 1/136209
(Continued)

(56) References Cited

U.S. PATENT DOCUMENTS 5,745,207 A 4/1998 Asada et al.
6,034,757 A 3/2000 Yanagawa et al.
(Continued)

FOREIGN PATENT DOCUMENTS

JP 2002-31812 1/2002
JP 2003-322869 11/2003
(Continued)

OTHER PUBLICATIONS

Office Action dated Apr. 22, 2014, issued in counterpart Japanese Application No. 2010-261948, with English translation.
(Continued)

*Primary Examiner* — Michael Caley
*Assistant Examiner* — Jia Pan
(74) *Attorney, Agent, or Firm* — Oblon, McClelland, Maier & Neustadt, L.L.P.

(57) ABSTRACT

A liquid crystal display panel includes switching elements, transparent pixel electrodes, and a transparent common electrode having a predetermined area overlapped with an upper layer of the transparent pixel electrode through an insulating film and driving liquid crystal with the transparent pixel electrode. In plane view, a shading layer covers at least one part of a conductive pattern where a light leakage occurs in front view by an alignment defect of the liquid crystal near a non-permeable conductive pattern disposed in the display region at the time of black display, and has eaves more protruding than the conductive pattern. The transparent common electrode is provided to overlap with the conductive pattern arranged to overlap with the light-shielding layer having the eaves in a side of the liquid crystal and to protrude compared with the light-shielding layer having the eaves in a planar view.

21 Claims, 12 Drawing Sheets

(51) Int. Cl.
*G02F 1/1362* (2006.01)
*G02F 1/13363* (2006.01)
*G02F 1/1368* (2006.01)
*G02F 1/1333* (2006.01)
*G02F 1/1339* (2006.01)

(52) U.S. Cl.
CPC ...... *G02F 1/13363* (2013.01); *G02F 1/13439* (2013.01); *G02F 1/133345* (2013.01); *G02F 1/133512* (2013.01); *G02F 1/133528* (2013.01); *G02F 1/136286* (2013.01); *G02F 2001/134318* (2013.01); *G02F 2001/134372* (2013.01); *G02F 2201/121* (2013.01); *G02F 2201/123* (2013.01); *G02F 2413/12* (2013.01)

(58) Field of Classification Search
USPC ............................................ 349/153, 110, 96
See application file for complete search history.

(56) References Cited

U.S. PATENT DOCUMENTS

| | | | |
|---|---|---|---|
| 6,693,687 B2 | 2/2004 | Ohta et al. | |
| 7,259,820 B2 | 8/2007 | Matsumoto | |
| 7,663,724 B2 | 2/2010 | Lim et al. | |
| 7,920,240 B2 | 4/2011 | Yonemura | |
| 2001/0048501 A1 | 12/2001 | Kim et al. | |
| 2004/0066480 A1 | 4/2004 | Yoshida et al. | |
| 2005/0179846 A1 | 8/2005 | Lee et al. | |
| 2005/0253141 A1 | 11/2005 | Ohta et al. | |
| 2006/0158597 A1* | 7/2006 | Ito | G02F 1/133345 349/141 |
| 2006/0262252 A1 | 11/2006 | Yonemura et al. | |
| 2007/0052899 A1 | 3/2007 | Lin et al. | |
| 2007/0273819 A1* | 11/2007 | Kawasaki | G02F 1/134363 349/141 |
| 2008/0002126 A1 | 1/2008 | Lim et al. | |
| 2008/0186440 A1 | 8/2008 | Lim et al. | |
| 2009/0310072 A1 | 12/2009 | Morii et al. | |
| 2009/0322975 A1* | 12/2009 | Song | G02F 1/133707 349/46 |
| 2009/0322995 A1 | 12/2009 | Yonemura et al. | |
| 2010/0296042 A1 | 11/2010 | Yonemura | |

FOREIGN PATENT DOCUMENTS

| | | |
|---|---|---|
| JP | 2005-234525 | 9/2005 |
| JP | 2008-014965 | 1/2008 |
| JP | 2008-191669 | 8/2008 |
| JP | 2009-237541 | 10/2009 |
| JP | 2010-008999 | 1/2010 |

OTHER PUBLICATIONS

United States Office Action dated Mar. 27, 2015 in U.S. Appl. No. 14/613,001.

* cited by examiner

LIQUID CRYSTAL DISPLAY PANEL AND LIQUID CRYSTAL DISPLAY DEVICE

INCORPORATION BY REFERENCE

This application is a continuation of U.S. application Ser. No. 13/251,613, filed Oct. 3, 2011, which is based upon and claims the benefit of priority from Japanese patent application No. 2010-261948, filed on Nov. 25, 2010, the disclosure of which is incorporated herein in its entirety by reference.

BACKGROUND OF THE INVENTION

1. Field of the Invention

The present invention relates to a liquid crystal display panel and a liquid crystal display device. More specifically, the present invention relates to a liquid crystal display panel and a liquid crystal display device of fringe field switching (FFS) type.

2. Description of Related Art

In recent years, in substitution for a conventional cathode-ray tube, new display devices having a thin flat-type display panel using principles of liquid crystal, electroluminescence or the like have been frequently used. A liquid crystal display device which represents these new display devices has characteristics in that it can be driven with a low power voltage, in addition to its thinness and lightness. The liquid crystal display device includes a liquid crystal layer disposed between two substrates. One substrate is an array substrate forming a display area in which a plurality of pixels are arranged in matrix, and the other substrate is a color filter substrate.

In particular, in a thin film transistor (TFT)-type liquid crystal display device, a TFT which is a switching element is provided in each pixel on the array substrate, and each pixel is able to independently carry a voltage to drive a liquid crystal layer, thereby making it possible to achieve the display of high quality with little crosstalk. Each pixel includes a gate line (scan line) that controls ON/OFF of the TFT, and a source line (signal line) for inputting image data. Each pixel is typically formed in an area surrounded by the gate line and the source line.

An In-Plane switching (IPS)-type liquid crystal display device has one array substrate on which a plurality of pixel electrodes and common electrodes (opposed electrodes) are alternately arranged, so as to apply a substantially-horizontal electric field to the substrate surface for display. The IPS type liquid crystal display device has better view angle property compared with a typical Twisted Nematic (TN) type. However, the conventional IPS-type liquid crystal display device has a smaller light transmission rate compared with that of the typical TN type.

As a system in which this defect is improved, a fringe field switching (FFS) system has been suggested. The FFS-type liquid crystal display device is the system of achieving the display by applying a fringe electric field (an oblique electric field including both components of a horizontal electric field and a vertical electric field) to a liquid crystal layer. In the FFS-type liquid crystal display device, the pixel electrode and the common electrode are formed on one array substrate as is similar to the IPS system. However, the pixel electrode and the common electrode are overlapped with each other with an insulation film interposed therebetween. Typically, the lower electrode is a plate electrode (the lower electrode may be a plurality of branch-like electrodes). Furthermore the upper electrode includes a comb-tooth electrode including a plurality of branch electrode parts electrically connected in common, and gap parts therebetween.

Both of the comb-tooth electrode and the plate electrode are formed of transparent conductive films in the FFS system, thereby achieving particularly high light transmission rate. In the FFS system, a liquid crystal layer is driven by a fringe electric field between upper and lower electrodes, which makes it possible to drive a liquid crystal layer on a branch-like electrode part which is not a gap part of the comb-tooth electrode as well. The pixel electrode and the common electrode are formed of transparent conductive films, which can improve a light transmission rate compared with the IPS system in which light rarely transmits on the pixel electrode and the common electrode.

The FFS-type liquid crystal display device can be roughly divided into two structures. The first structure is that, on the array substrate, a common electrode which is a common potential is formed of a plate electrode arranged on the side of the lower layer, and a pixel electrode into which a pixel potential is written through a thin-film transistor is formed of a comb-tooth electrode arranged on a side of the upper layer (e.g., Japanese Unexamined Patent Application Publication Nos. 2002-31812 and 2005-234525). The second structure is that, on the array substrate, a common electrode and a pixel electrode are opposite to the arrangement stated above. Specifically, the common electrode is formed of a comb-tooth electrode in the upper layer, and the pixel electrode is formed of a plate electrode in the lower layer (e.g., Japanese Unexamined Patent Application Publication No. 2008-191669). Japanese Unexamined Patent Application Publication No. 2003-322869 discloses a structure in which one of the two electrodes of the plate electrode and the comb-tooth electrode is formed in the color filter substrate in place of the array substrate.

In the second structure stated above, a black matrix is typically arranged only in order to prevent color mixture of adjacent pixels. In other words, the black matrix having a width equal to or smaller than that of a source line is typically arranged on the source line. The reason that this structure can be employed is that it is possible to shield the electric field from the source line by arranging the comb-tooth electrode which is the common electrode on the source line while being overlapped with each other. In other words, this is because it is possible to prevent occurrence of a domain due to alignment disorder of liquid crystal due to an electric field from the source line. Further, Japanese Unexamined Patent Application Publication No. 2008-191669 described above discloses the structure that does not include the black matrix itself. By employing such a structure, even a part just beside the source line can contribute to the display, which can improve the light transmission rate.

SUMMARY OF THE INVENTION

However, the present inventors have found that, in the liquid crystal display device having the second structure of FFS type, the contrast decreases around the source line. In short, it is desired to increase the contrast in the recent liquid crystal display device. While described above is the problem in the source line, the similar problem may occur in a non-transparent conductive pattern formed in a display area.

The present invention has been made in view of the background described above. One object of the present invention is to provide a liquid crystal display panel and a liquid crystal display device that are capable of improving contrast.

A first exemplary aspect of the present invention is a liquid crystal display panel including liquid crystal sealed between a first substrate and a second substrate, in which the first substrate includes: gate lines; source lines that are formed to cross the gate lines; switching elements that are arranged near the intersections of the gate lines with the source lines; pixel regions that are specified by the gate lines and the source lines, the pixel regions being arranged in matrices; transparent pixel electrodes that are connected to the switching elements; and a transparent common electrode that includes at least branch-like electrode parts and gap parts between the branch-like electrode parts, the transparent common electrode being arranged in an upper layer of the transparent pixel electrodes so that a predetermined area of the transparent common electrode is overlapped with the transparent pixel electrode with an insulating film interposed therebetween, the transparent common electrode being configured to drive the liquid crystal with the transparent pixel electrode. In plane view, a shading layer covers at least one part of a conductive pattern where a light leakage occurs in front view by an alignment defect of the liquid crystal near a non-permeable conductive pattern disposed in the display region at the time of black display, and has eaves more protruding than the conductive pattern. The transparent common electrode is provided so as to overlap with the conductive pattern overlapped with the light-shielding layer having the eaves in a side of the liquid crystal and to protrude compared with the light-shielding layer having the eaves in a planar view.

The present invention achieves the excellent effect that it can provide a liquid crystal display panel and a liquid crystal display device that are capable of improving contrast.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
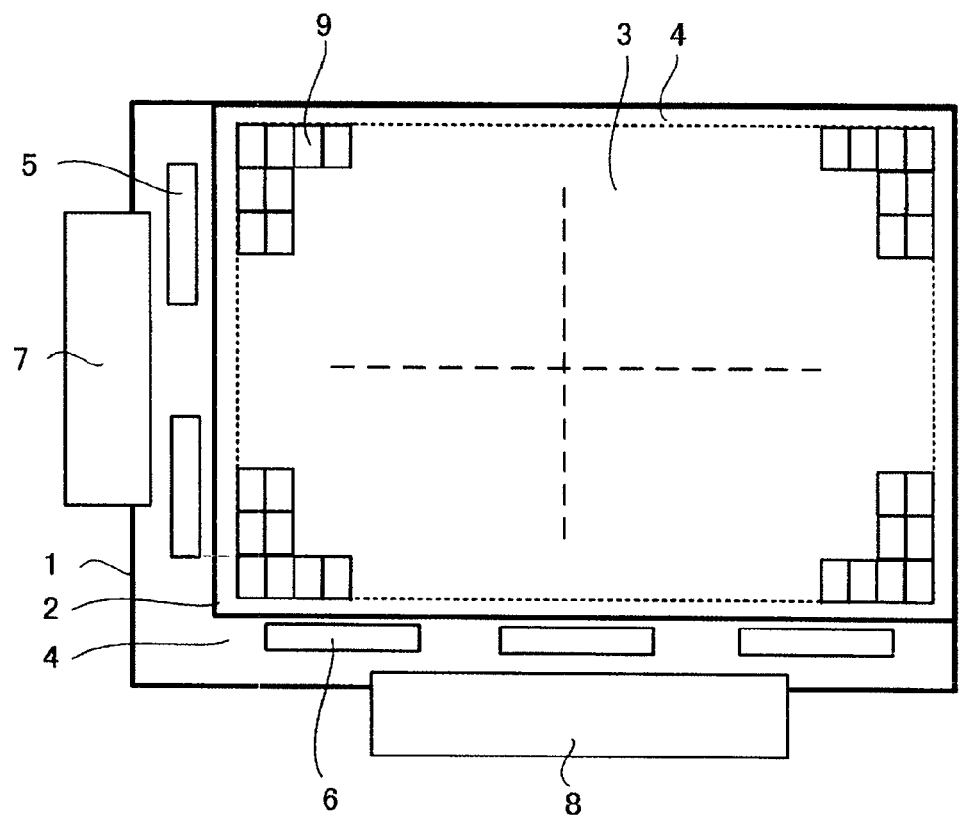
FIG. 1 is a schematic plane view of a liquid crystal display panel according to a first exemplary embodiment.

Hereinafter, exemplary embodiments of the present invention will be described as an example. The size and the ratio of each element in the drawings are shown for the convenience of description, and are different from the actual ones.

First Exemplary Embodiment

FIG. 1 is a schematic plane view for describing one example of a liquid crystal display panel mounted on a liquid crystal display device according to a first exemplary embodiment of the present invention. The liquid crystal display device includes a liquid crystal display panel 100 of active matrix type in which an array substrate 1 which is a first substrate is arranged opposite to a color filter substrate 2 which is a second substrate with liquid crystal interposed therebetween. The array substrate 1 includes gate lines, source lines, TFTs, pixel electrodes, a transparent common electrode supplied with a reference potential and the like formed on a transparent substrate made of glass, plastic, or the like. The color filter substrate 2 includes a color filter, a black matrix which is a light-shielding layer and the like formed on a transparent substrate made of glass, plastic, or the like.

The liquid crystal display panel 100 includes a display area 3 which contributes to a display, and a frame area 4 which is provided in an outer periphery of the display area 3. The frame area 4 includes gate line drive circuits 5 and source line drive circuits 6 mounted thereon by a Chip On Glass (COG) mounting technique. Further, in the end of the array substrate 1, a plurality of terminals (not shown) are arranged. In order to supply various voltages, clocks, image data or the like to the gate line drive circuits 5 and the source line drive circuits 6, the plurality of terminals are connected to flexible substrates 7 and 8 connected to an external circuit. Note that the gate line drive circuits 5 and the source line drive circuits 6 may be integrated into one drive circuit. Further, the flexible substrates 7 and 8 may be integrated into one flexible substrate.

The liquid crystal display device contains the liquid crystal display panel 100 structured as stated above, a backlight unit (not shown) which is a light source and the like in a housing. The backlight unit is typically arranged in a side opposite to a display surface. The display surface of the liquid crystal display panel 100 is contained so as to be viewed from inside the housing.

When an electric signal is externally input to the liquid crystal display device including the liquid crystal display panel 100 as described above, a drive voltage is applied to transparent pixel electrodes 14 and a transparent common electrode 15, which changes the direction of molecules of the liquid crystal according to the drive voltage. Then, light emitted from the backlight unit is interrupted or transmitted to an observer through the array substrate 1, the liquid crystal, and the color filter substrate 2, thereby achieving display of video or the like on the display surface of the liquid crystal display panel 100.

Figure 2:
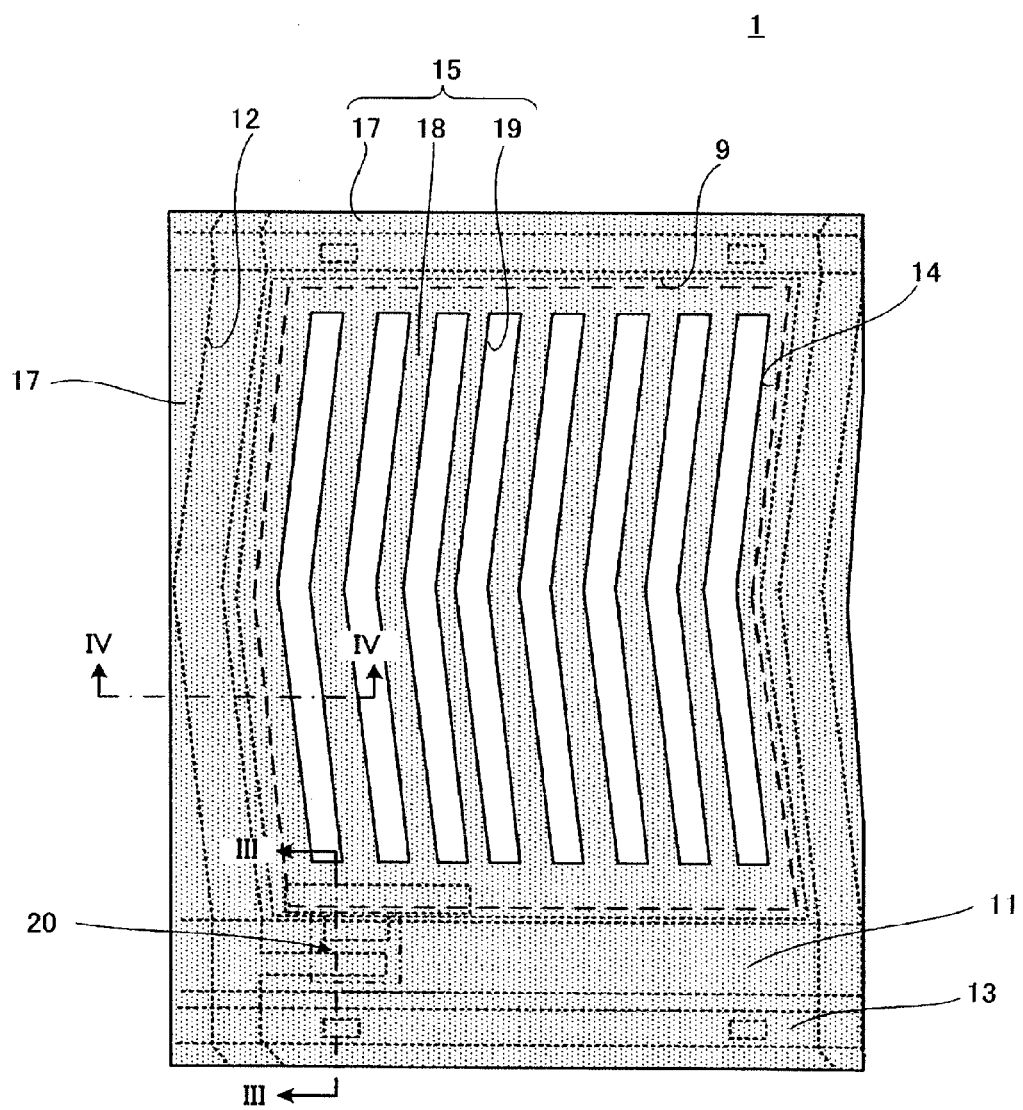
FIG. 2 is an enlarged schematic plane view showing a main part of a display area of an array substrate according to the first exemplary embodiment.
Figure 3:
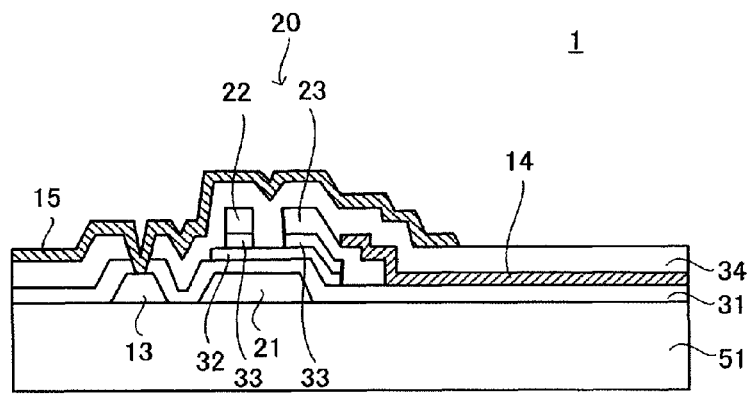
FIG. 3 is a cross-sectional view taken along the line of FIG. 2.

FIG. 2 is an enlarged schematic plane view showing a main part of the display area 3 of the array substrate 1 according to the first exemplary embodiment. FIG. 3 is a cross-sectional view taken along the line of FIG. 2.

The array substrate 1 includes a transparent substrate 51 made of glass, plastic, or the like, gate lines 11, source lines 12, common lines 13, the transparent pixel electrodes 14 which are a plate electrode arranged in the side of the lower layer, and a transparent common electrode 15 which is a comb-tooth electrode arranged in the side of the upper layer. The array substrate 1 further includes TFTs 20, gate electrodes 21, source electrodes 22, drain electrodes 23, a gate insulating film 31, a semiconductor film 32, an ohmic contact film 33 and the like.

As shown in FIG. 2, the gate line 11 extends in a lateral direction and a plurality of gate lines 11 are arranged in a vertical direction. The common line 13 is formed in parallel to the gate line 11 in the same layer as the gate line 11 (see FIG. 2). The common line 13 serves to supply a reference potential to the transparent common electrode 15. Each of the gate line 11 and the common line 13 can be formed of a single layer film of metal (e.g., Al, Cr, Mo, Ti, Ta, W, Ni, Cu, Au, Ag) or alloy thereof, or laminated films thereof. The gate insulating film 31 is formed in the upper layer of the gate lines 11 and the common lines 13, and may be formed of an oxide film, a nitride film, or the like, for example.

The source line 12 is arranged to be perpendicular to the gate line 11 on the gate insulating film 31. The source line 12 has a bending structure of a dog-leg shape extended in a vertical direction with a multi-domain pixel structure in order to deal with color shifting, and a plurality of source lines 12 are arranged in a lateral direction (see FIG. 2). The source line 12 may be formed of a single layer film of metal (e.g., Al, Cr, Mo, Ti, Ta, W, Ni, Cu, Au, Ag) or alloy thereof, or laminated films thereof, for example.

The TFT 20 which serves as a switching element is arranged near the intersection of the gate line 11 with the source line 12. In the TFT 20, a part of the gate electrode 21 is arranged opposite to the source electrode 22 and the drain electrode 23 with the gate insulating film 31, the semiconductor film 32, and the ohmic contact film 33 interposed therebetween. The gate line 11 in which the TFT 20 is formed serves as the gate electrode 21, and a part extending from the source line 12 in the TFT 20 serves as the source electrode 22. The gate lines 11 and the source lines 12 form a plurality of pixel regions 9 arranged in matrices in the display area 3.

The semiconductor film 32 is formed above the gate insulating film 31. The ohmic contact film 33 is laminated onto the semiconductor film 32, and is formed of a layer obtained by implanting impurities into the semiconductor film 32, for example. The ohmic contact film 33 that is arranged between the source electrode 22 and the drain electrode 23 is removed, which serves as a channel part. The source electrode 22 and the drain electrode 23 are formed in the same layer as the source line 12, and are formed on the ohmic contact film 33 so as to overlap thereon.

The transparent pixel electrode 14 is formed in the pixel region 9 in a plate shape (planar shape). The transparent pixel electrode 14 is formed of a transparent conductive film such as an indium tin oxide (ITO) film, or an indium zinc oxide (IZO) film. The transparent pixel electrode 14 is formed on the drain electrode 23 so as to be directly overlapped thereon for electrical connection. The transparent pixel electrode 14 may be formed in the lower layer of the drain electrode 23 for electrical connection, or may be formed in the upper layer of the drain electrode 23 through a contact hole for electrical connection.

A protection film 34 is formed in the upper layer of the source line 12, the source electrode 22, the drain electrode 23, and the transparent pixel electrode 14. The protection film 34 may be a single layer film of an insulating film (e.g., an oxide film, a nitride film, or an organic resin film), or may be laminated films thereof.

The transparent common electrode 15 is arranged opposite to the transparent pixel electrode 14 in a predetermined area with the protection film 34 interposed therebetween. The transparent common electrode 15 is formed of a transparent conductive film such as ITO, IZO, or the like. In the transparent common electrode 15, branch-like electrode parts 18 electrically connected each other, slit-like gap parts 19 from which the transparent conductive film is removed, and a connection electrode part 17 connecting the branch-like electrode parts 18 are formed. The liquid crystal is driven by generating a fringe electrical field between the transparent common electrode 15 and the transparent pixel electrode 14.

By covering substantially all of the gate line 11, the source line 12, the common line 13, and the TFT 20 with the connection electrode part 17 and forming a lattice shape of the connection electrode part 17, the resistance of the transparent common electrode 15 may further be lowered. Further, even when a part of the common line 13 is disconnected, the reference potential is supplied to the transparent common electrode 15 through the connection electrode part 17, which can prevent a display defect and improve a yield.

Further, since the connection electrode part 17 covers the gate line 11, the source line 12, the common line 13, and the TFT 20, a leakage electric field to the liquid crystal layer can be shielded. As a result, the display defect due to the leakage electric field that tends to be generated near the gate line 11, the source line 12, the common line 13, and the TFT 20 can be suppressed.

Note that the connection electrode part 17 is not limited to the structure above, but may be changed in various ways. For example, the connection electrode part 17 may be formed only on the gate line 11 and the source line 12, and the branch-like electrode parts 18 of the adjacent pixel regions 9 may be connected each other.

Figure 4:
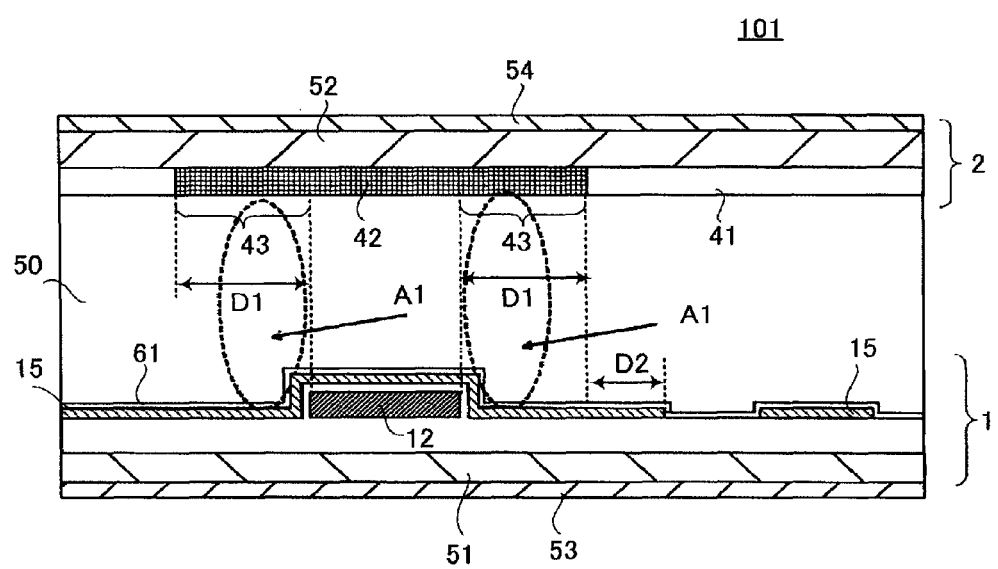
FIG. 4 is a schematic cross-sectional view of the liquid crystal display panel according to the first exemplary embodiment.

FIG. 4 shows a schematic cross-sectional view near the source line 12 arranged in the display area 3 of the liquid crystal display panel 100 according to the first exemplary embodiment. For the sake of convenience of explanation, FIG. 4 schematically shows only the elements needed for the explanation, and the transparent pixel electrode 14 and the like are not shown. FIG. 4 corresponds to a view taken along the line IV-IV of FIG. 2.

The liquid crystal display panel 100 includes, as shown in FIG. 4, liquid crystal 50 held between the array substrate 1 and the color filter substrate 2, transparent substrates 51 and 52, a lower-side polarizing plate 53, and an upper-side polarizing plate 54. The lower-side polarizing plate 53 is arranged in an external principal surface of the array substrate 1, and the upper-side polarizing plate 54 is arranged in an external principal surface of the color filter substrate 2. Absorption axes of the upper-side polarizing plate 54 and the lower-side polarizing plate 53 are arranged so as to be perpendicular to each other.

The cell gap between the array substrate 1 and the color filter substrate 2 is set, e.g., as 2 to 5 μm. A color filter 41, a black matrix 42, an alignment film (not shown) and the like are arranged on the color filter substrate 2.

The source lines 12 are formed on the array substrate 1, as described above, and the transparent common electrode 15 which is a comb-tooth electrode is arranged in the upper layer of the source lines 12 so as to overlap with the source lines 12 with the protection film 34 interposed therebetween. The transparent common electrode 15 above the source lines 12 serves to shield the electric field from the source lines 12. Further, an alignment film 61 is formed in the uppermost layer of the array substrate 1.

As shown in FIG. 4, the black matrix 42 is arranged so as to overlap with the source line 12 in a plane view above the source line 12. By providing the black matrix 42, color mixture in the adjacent pixels can be prevented. In the first exemplary embodiment, the black matrix 42 is arranged only in a position described below so as to cover the upper part of the source line 12.

The black matrix 42 includes eaves 43 having a distance D1 on outer sides in a width direction of the source line 12. In the first exemplary embodiment, the distance D1 (overhanging amount) of the eaves 43 is set to be equal to or larger than 3.0 μm. In other words, the width of the black matrix 42 above the source line 12 is set to be larger than that of the source line 12 by 6.0 μm or larger. Note that it is not necessary that the both end parts of the eaves 43 arranged at both ends of the black matrix 42 in a width direction have the distance D1, but they may have different values.

The transparent common electrode 15 is arranged above the source line 12 so as to protrude with respect to the black matrix 42 in both ends in the width direction. Specifically, the widths of both end parts of the transparent common electrode 15 protrude compared to the end parts of the black matrix 42 by a distance D2. In the first exemplary embodiment, each end part of the transparent common electrode 15 protrudes (overhangs) compared to the black matrix 42 by 2.5 μm in both ends in the width direction.

Next, a manufacturing method of the liquid crystal display panel 100 according to the first exemplary embodiment will be described. The array substrate 1 is manufactured by forming the TFT 20, the transparent pixel electrode 14, the transparent common electrode 15 and the like on one surface of a glass substrate by repeatedly using a pattern forming process including film forming, patterning by photolithography, etching and the like. The color filter substrate 2 is manufactured by forming the color filter 41 and the black matrix 42 on one surface of a glass substrate.

Next, processes before the array substrate 1 and the color filter substrate 2 are attached will be described. First, in a substrate cleaning process, the array substrate 1 on which the transparent pixel electrode 14 is formed is cleaned. Next, in an alignment film material applying process, an organic film or the like made of polyimide which is a material of an alignment film is applied on one surface of the array substrate 1 by a printing method, which is then subjected to sintering processing by a hot plate to dry this part. After that, alignment processing is performed on the manufacturing substrate on which the alignment film material is applied. The alignment processing is performed by rubbing the surface of the alignment film in a predetermined direction by rotating a rubbing roller in which a cloth made of nylon (registered trademark) or the like is rolled while pressing it at a predetermined pressure. Further, the alignment film of the color filter substrate 2 is similarly formed by performing processing including cleaning, application of an organic film, and alignment.

Figure 5:
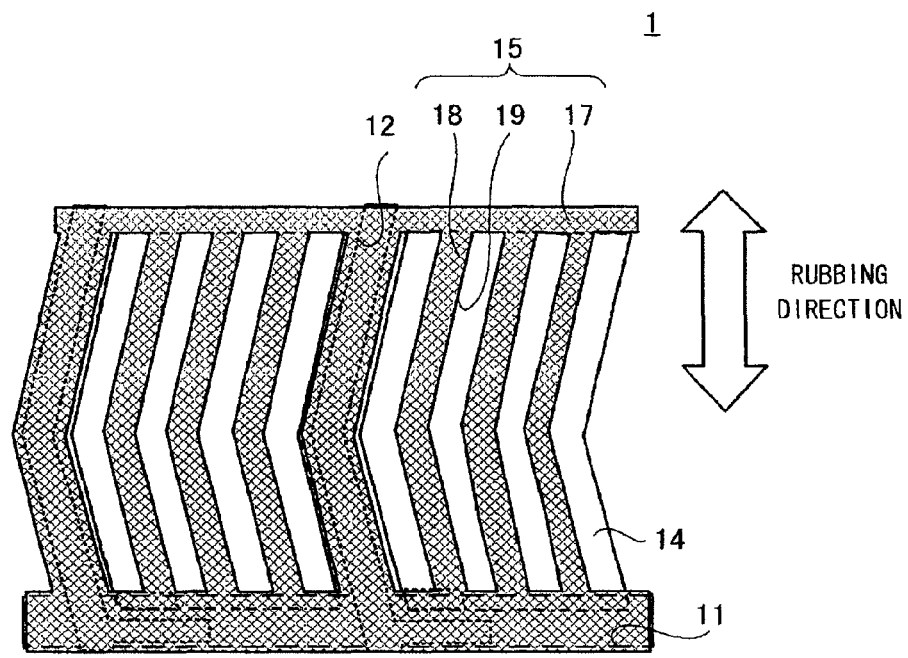
FIG. 5 is a schematic cross-sectional view of the liquid crystal display panel according to the first exemplary embodiment.

FIG. 5 shows a schematic plane view of element parts of the array substrate 1 of the liquid crystal display device according to the first exemplary embodiment. The array substrate 1 includes, as described above, the source lines 12 which are bended in a dog-leg shape. The transparent common electrode 15 also includes the branch-like electrode parts 18 and the gap parts 19 bended in a dog-leg shape in the same direction as the source lines 12.

Figure 6:
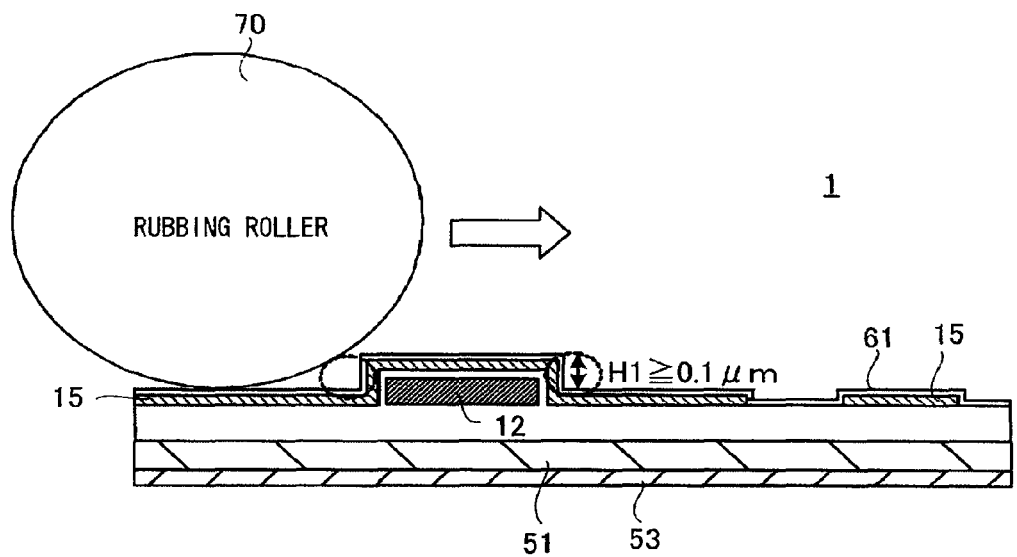
FIG. 6 is an explanatory view of alignment processing of the liquid crystal display panel according to the first exemplary embodiment.

When the source lines are formed in a linear shape, the rubbing direction and the source lines can be made parallel to each other. In the first exemplary embodiment, it is advantageous for color shifting. The source line 12 has a dog-leg shape in the first exemplary embodiment, which cannot parallel the rubbing direction and the source line (see FIG. 5). Accordingly, when the rubbing processing is performed, the rubbing roller 70 ascends or descends the step of the source line 12 as shown in FIG. 6.

Next, in a sealant applying process to form sealant, resin which is sealant is applied to one surface of the array substrate 1 and the color filter substrate 2. Thermosetting hard resin such as epoxy adhesive or ultraviolet hardening resin is used as the sealant, for example.

The array substrate 1 and the color filter substrate 2 manufactured according to the process above are arranged to be opposite to each other, and the pixels of the panels formed in the respective substrates are attached by being aligned to correspond with each other. The curing processing is performed for curing the sealant to the array substrate 1 and the color filter substrate 2 attached in the above way. This process is performed, for example, by applying heat or irradiating it with ultraviolet rays according to the material of the sealant.

Next, a thinning polishing process and the like are performed on the transparent substrate by chemical polishing using chemicals and physical polishing to polish the substrate with an abrasive as needed. Next, in a cell dividing process, the attached substrate is divided into separate cells corresponding to each of the liquid crystal display panels 100. After the cell dividing process, a liquid crystal implanting process to implant liquid crystal from a liquid crystal inlet is performed in vacuum. Further, in a sealing process, by applying photocurable resin to a liquid crystal inlet and irradiating it with light, the liquid crystal inlet is sealed.

Next, in a polarizing plate attaching process, a polarizing plate is attached to the outside of the array substrate 1 and the color filter substrate 2. Subsequently, in a control substrate mounting process, a control substrate is mounted, which completes the liquid crystal display panel 100. After that, the liquid crystal display panel 100 and the backlight unit are embedded and held in a housing, which completes the liquid crystal display device. Note that the manufacturing method is merely an example, and is not limited to the method stated above.

Figure 7:
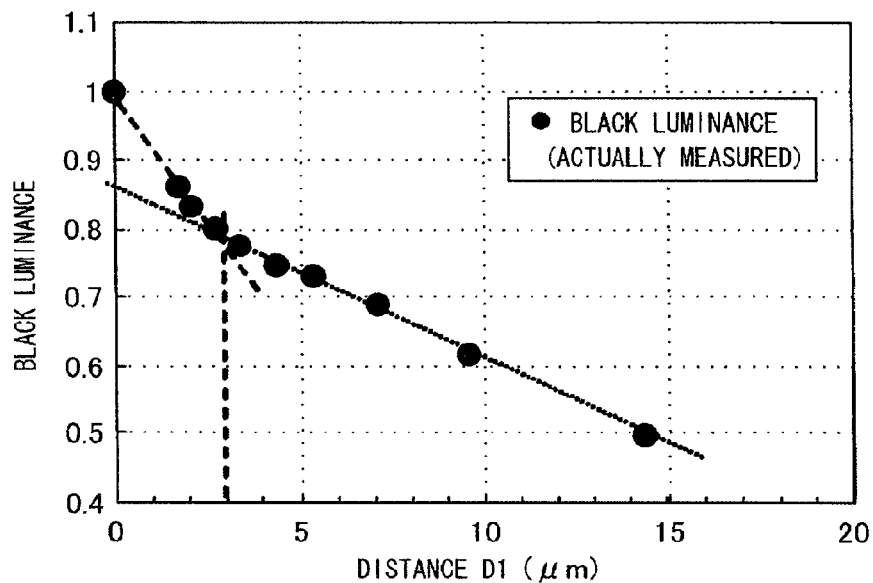
FIG. 7 is a graph in which measured values of a black luminance in a frontal direction are plotted with respect to a distance D1 of eaves of a black matrix on a source line.

FIG. 7 shows a correlation diagram in which measured values of a luminance at the time of black display in a frontal direction (hereinafter referred to as "black luminance") are plotted with respect to the distance D1 of the eaves 43 of the black matrix 42 on the source line 12. The sample in which the distance D1 is in the range of 0 μm to 15 μm is manufactured to perform evaluation. Note that the graph of FIG. 7 standardized the black luminance of the following conditions for 1. That is, it is the condition that the source wire 12 and the black matrix 42 have the same width and overlap each other in a plane view (i.e., the condition that does not provide the eaves 43 to the black matrix 42). Further, each bending angle of the source lines 12, the branch-like electrode part 18 and the gap part 19 of the transparent common electrode 15 in the sample is set as about 10°.

It is shown in FIG. 7 that the black luminance can be suppressed by arranging the eaves 43 in the black matrix 42. Larger value of the distance D1 of the eaves 43 means higher effect of the suppression of the black luminance. Further, it is shown in FIG. 7 that the gradient of the distance D1 of the eaves 43 changes when the distance D1 reaches 3.0 μm. In short, a change point exists at the distance D1 of 3.0 μm. More specifically, when the distance D1 of the eaves 43 is smaller than 3.0 μm, the gradient is large, which means it is possible to obtain higher effect of decreasing the black luminance with respect to the increase amount of the distance D1 of the eaves 43. On the other hand, when the distance D1 of the eaves 43 is 3.0 μm or larger, the gradient is smaller than the former case, which means the effect of decreasing the black luminance with respect to the increase amount of the distance D1 of the eaves 43 is smaller than the former case.

Figure 8:
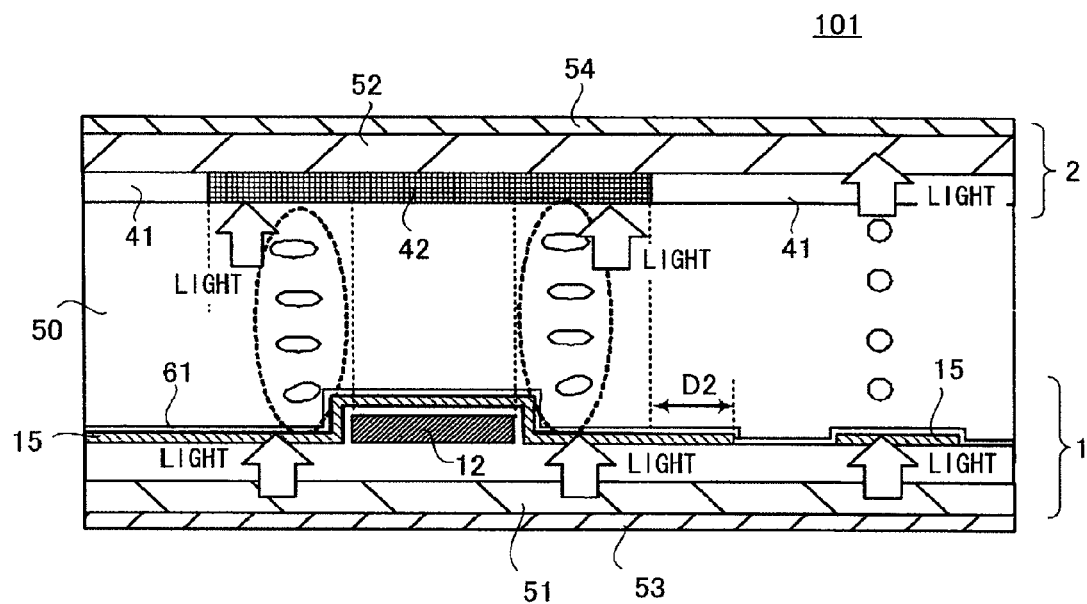
FIG. 8 is a schematic explanatory view for describing a cause of an increase in the black luminance.

When the distance D1 of the eaves 43 is smaller than 3.0 μm, it can be estimated that the black luminance increases due to both of a light leakage (see FIG. 8) by the alignment defect of the liquid crystal 50 beside the source line 12 and a light leakage of light-scattering components due to thermal fluctuation of the liquid crystal 50 in the color filter opening part. On the other hand, when the distance D1 of the eaves 43 is 3.0 μm or larger, it can be estimated that the black luminance increases only due to the light leakage of light-scattering components due to the thermal fluctuation of the liquid crystal 50 in the color filter opening part.

It is experimentally confirmed that the area with the alignment defect near the source line 12 influences on the black luminance. The reason why the light leakage occurs due to the alignment defect of the liquid crystal 50 beside the source line 12 is that, since the step of the source line 12 is typically equal to or larger than 0.1 μm, the defect of the alignment film tends to occur in this area. The defect of the alignment film 61 is considered to occur since the rubbing cloth rolled in the rubbing roller cannot rub the step part of the source line 12 in the similar way as in other areas due to the step of the source line 12, and the liquid crystal cannot be aligned in a desired direction. As a result, the alignment defect easily occurs and the black luminance tends to increase in the liquid crystal beside the source line 12. When metal like chrome is used as a conventional common electrode, the alignment defect near the source line is shielded by lines. In this case, such a phenomenon did not occur.

As is clear from FIG. 7, by arranging the eaves 43, the increase in the black luminance can be suppressed. The first reason is that the presence of the eaves 43 leads to suppression of the increase in transmission light components due to the alignment defect in the liquid crystal 50 beside the source line 12 (areas shown in A1 in FIG. 4). The second reason is that the presence of the eaves 43 can prevent the light leakage due to dynamic light-scattering components caused by the thermal fluctuation.

However, an excessive increase in the distance D1 of the eaves 43 of the black matrix 42 leads to a decrease in the opening ratio. This may decrease the white luminance and reduce the contrast. In other words, the contrast can be improved by preventing the white luminance from being greatly decreased. The present inventors have made further examination of the distance D1 of the eaves 43 of the black matrix 42 to decrease the reduction degree of the white luminance.

Figure 9:
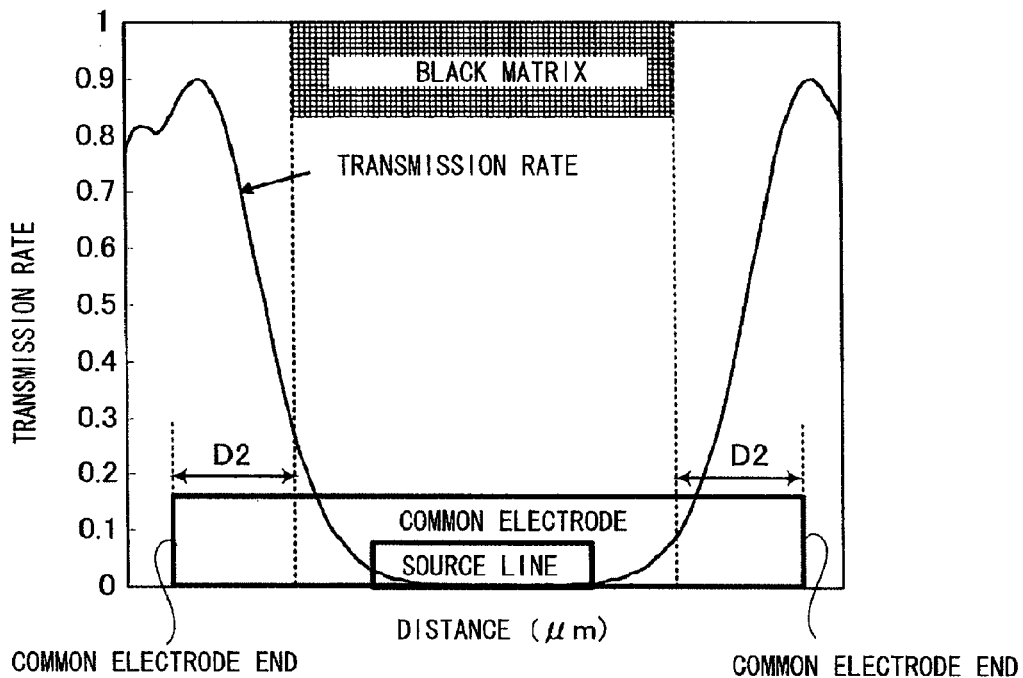
FIG. 9 is electrode position dependent calculation data of a transmission rate at a time of white display.

FIG. 9 shows electrode position dependent calculation data of the transmission rate when the white display is performed. The calculation is performed using a commercially available simulator (Sintech, Inc.: LCD-Master). It is apparent from FIG. 9 that the transmission rate becomes high in the vicinity of the edge parts of the transparent common electrode 15. It is thus understood that the decrease in the white luminance can be suppressed by preventing the edge parts of the transparent common electrode 15 from being shielded by the black matrix 42.

Figure 10:
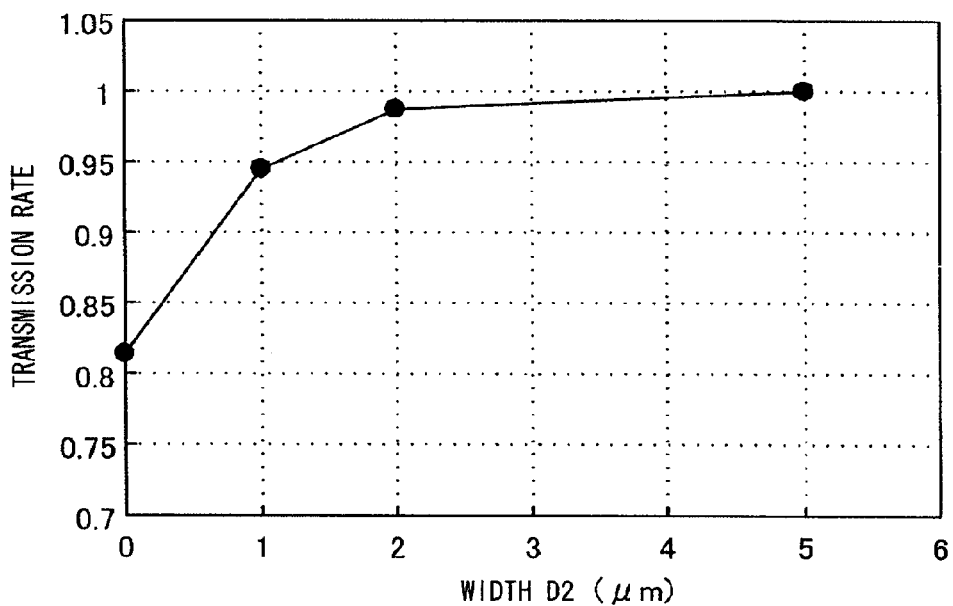
FIG. 10 is a transmission rate from an end part of the black matrix to an edge part of a common electrode with respect to a distance D2.

FIG. 10 shows a transmission rate from the end part of the black matrix 42 to the edge part of the transparent common electrode 15 with respect to the distance D2. In the graph shown in FIG. 10, the transmission rate when the distance D2 from the end part of the black matrix 42 to the edge part of the common electrode 15 is 5 μm is specified as 1.

It is clear from FIG. 10 that the white luminance can be improved by ensuring the distance D2 from the end part of the black matrix 42 to the edge part of the transparent common electrode 15. In particular, it is clear that the contrast can be improved more efficiently by setting the distance D2 as 2.5 μm or larger.

According to the first exemplary embodiment, the transparent conductive film is used as both of the transparent pixel electrode 14 and the transparent common electrode 15, thereby capable of providing a liquid crystal display device of FFS type with high transmission rate. Further, according to the first exemplary embodiment, it is only required to change the mask for forming the transparent common electrode and the light-shielding layer, which does not require introduction of new equipments. It has further advantage that the number of process steps does not increase.

Further, according to the first exemplary embodiment, by providing the black matrix 42 overlapped with the source line 12 and providing the eaves 43 at both end parts in the width direction of the black matrix 42, the increase in the black luminance in the frontal direction can be suppressed. Further, since the transparent common electrode 15 is arranged above the source line 12 to project at both end parts in the width direction compared with the black matrix 42, the reduction in the white luminance can be suppressed. This is because the high transmission part of the edge parts of the transparent common electrode 15 are prevented from being shielded. As a result, the contrast can be improved.

In addition, according to the first exemplary embodiment, the distance D1 of the eaves 43 of the black matrix 42 is set to be 3.0 μm or larger. Accordingly, it is possible to suppress the increase in the black luminance more efficiently. Further, the distance D2 from the edge part of the transparent common electrode 15 to the end part of the black matrix 42 is set as 2.5 μm or larger. Accordingly, it is possible to suppress the decrease in the white luminance more efficiently. As a result, the contrast can be improved more efficiently.

When the source line is formed in a non-linear shape such as a dog-leg shape, the rubbing direction and the source line cannot be made parallel, which tends to generate the alignment defect of the liquid crystal beside the source line. The present invention is especially effective for such a configuration.

When the disorder of the alignment of the liquid crystal near the gate line 11, the common line 13, and the TFT 20 becomes a problem, the black matrix can be provided also above these lines to provide the eaves. For example, when a structure of top-gate type is employed, the black matrix may be provided to cover the gate line at least above the gate line, and the eaves may be provided in both end parts of the black matrix. The similar configuration may be employed for the common line.

Described above is the example in which the bending angle of the source line 12 and the transparent common electrode 15 is 10°. This is merely an example, however, and the bending angle may be any desired value. Further, described above is the example in which one bending structure is formed in the source line 12 arranged between the two pixel regions 9. However, a plurality of bending structures may be formed. Further, the bending shape may be designed in a desired way. Furthermore, it is needless to say that the present invention can be applied to the one in which the source line 12 has a linear shape. The bending structure may be provided in the side of the gate line instead of the source line.

Second Exemplary Embodiment

Next, one example of a liquid crystal display device having a structure different from that of the first exemplary embodiment will be described. In the following description, the same element members as those in the first exemplary embodiment are denoted by the same reference symbols, and its description will be omitted as appropriate.

Described in the second exemplary embodiment is one example of the liquid crystal display device that aims to improve contrast from an oblique direction in addition to contrast from a frontal direction.

Figure 11A:
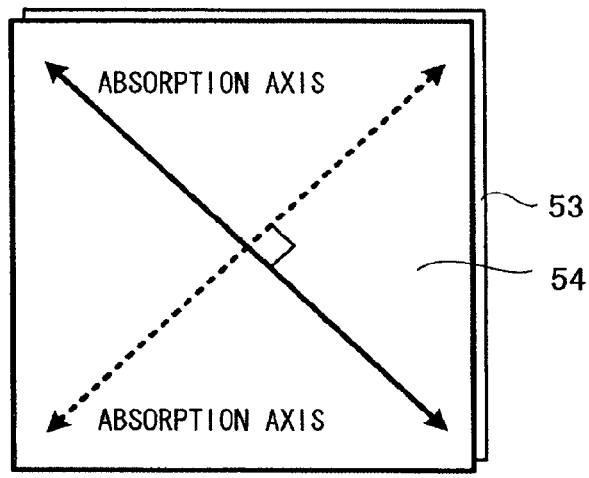
FIG. 11A is an explanatory view of absorption axes of a lower-side polarizing plate and an upper-side polarizing plate seen from a frontal direction.
Figure 11B:
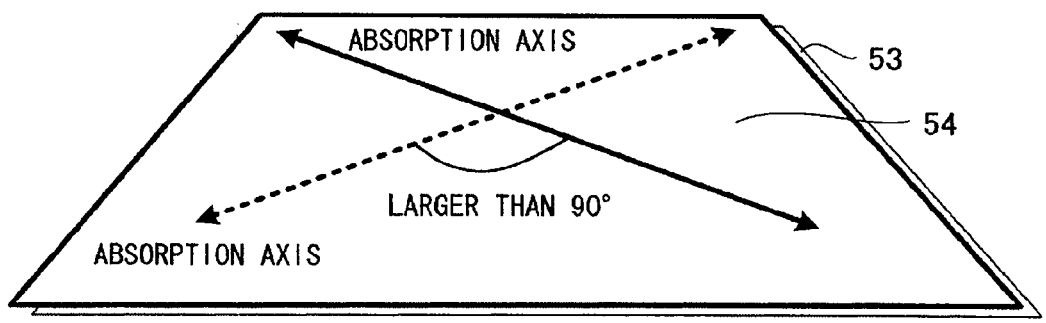
FIG. 11B is an explanatory view of absorption axes of the lower-side polarizing plate and the upper-side polarizing plate seen from an oblique direction.

FIG. 11A is an explanatory view of absorption axes of a lower-side polarizing plate 53 and an upper-side polarizing plate 54 seen from a frontal direction, and FIG. 11B is an explanatory view of absorption axes of the lower-side polarizing plate 53 and the upper-side polarizing plate 54 seen from an oblique direction. When the liquid crystal display panel is seen from the frontal direction, the angle of the absorption axes of the lower-side polarizing plate 53 and the upper-side polarizing plate 54 is 90° as shown in FIG. 11A, whereas the angle of the absorption axes of the lower-side polarizing plate 53 and the upper-side polarizing plate 54 seen from the oblique direction is larger than 90° as shown in FIG. 11B.

Figure 12:
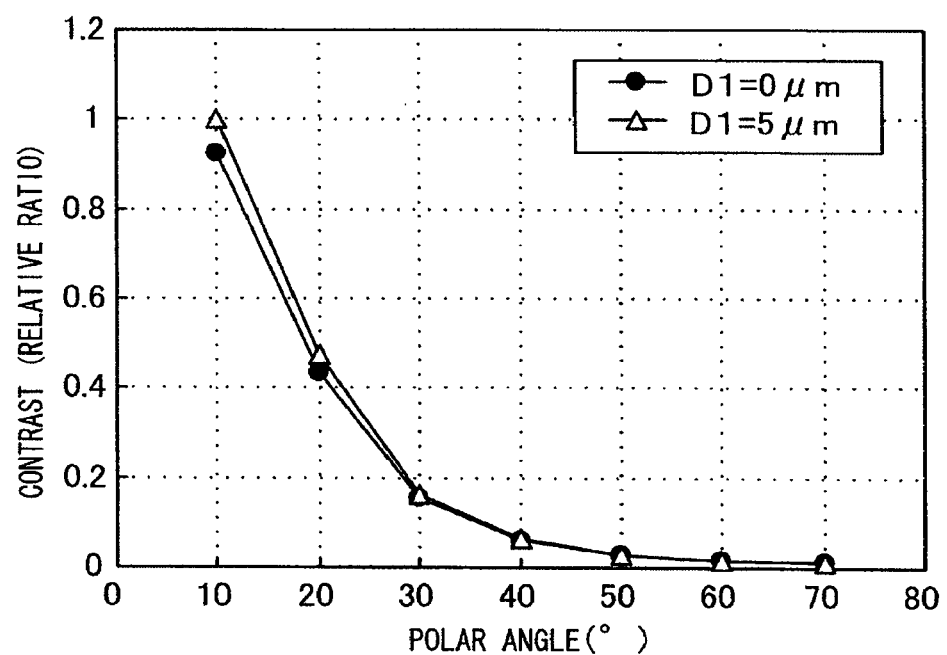
FIG. 12 is a graph in which contrast is plotted with respect to a polar angle.
Figure 13A:
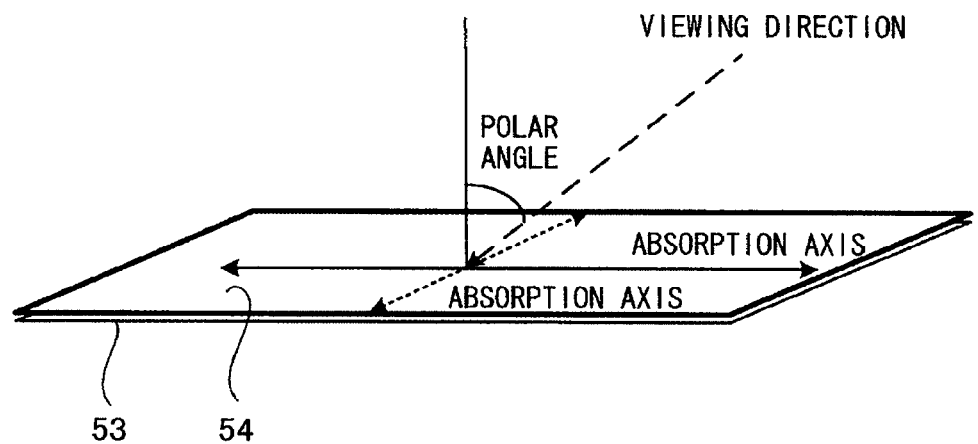
FIG. 13A is an explanatory view for describing the polar angle.
Figure 13B:
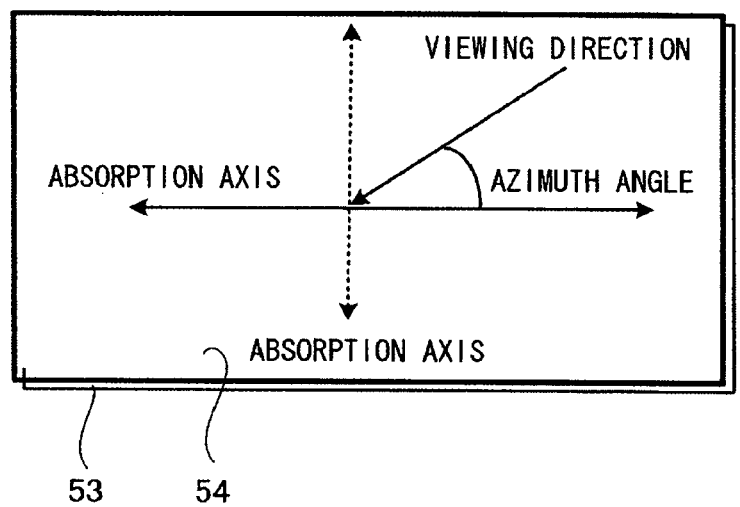
FIG. 13B is an explanatory view for describing an azimuth angle.

FIG. 12 shows a graph in which contrast is plotted with respect to a polar angle. The one that does not have the eaves 43 of the black matrix 42, which means the one in which the black matrix 42 and the source line 12 are substantially overlapped (D1=0), and the one in which the distance D1 of the eaves 43 of the black matrix 42 is 5 µm are manufactured and used as samples. The polar angle here means, as shown in FIG. 13A, an angle between the viewing direction and the normal direction of the polarizing plate. Further, an azimuth angle that will be mentioned later means, as shown in FIG. 13B, an angle between the direction in which the viewing direction is projected to the upper-side polarizing plate 54, and the absorption axis of the upper-side polarizing plate 54.

As shown in FIG. 12, with increasing the polar angle (with increasing the oblique view), it is understood the light leakage increases and the contrast decreases. More specifically, it is empirically confirmed that, at the azimuth angle 45°, when the angle is an oblique view of the polar angle of 30° or larger, the light leakage due to the oblique view is larger than the light leakage due to the alignment defect near the source line 12, which loses the effect of the distance D1 of the eaves 43 of the black matrix 42.

The present inventors have thus examined the structure to increase the contrast not only in the frontal direction but also in the oblique view. As a result, it is turned out that the light leakage due to the polarizing plate can be suppressed by adding a two-axis phase difference film between the polarizing plate (polarizer) and the liquid crystal. Note that a polarizing plate with a two-axis phase difference film may be used. In this case, the polarizer is arranged in the outer side.

Figure 14:
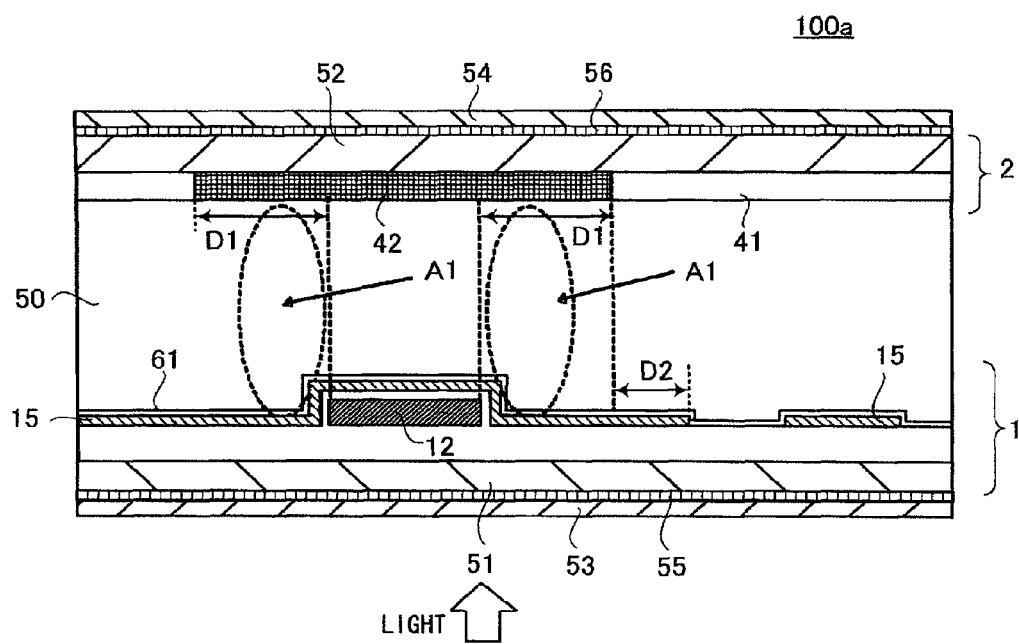
FIG. 14 is a schematic cross-sectional view of a liquid crystal display panel according to a second exemplary embodiment.

FIG. 14 shows a schematic cross-sectional view of the liquid crystal display device according to the second exemplary embodiment. A liquid crystal display panel 100a includes a lower-side polarizing plate 53, and an upper-side polarizing plate 54. A two-axis phase difference film 55 is arranged between the lower-side polarizing plate 53 and the transparent substrate 51 forming the array substrate 1. Further, a two-axis phase difference film 56 is arranged between the upper-side polarizing plate 54 and the transparent substrate 52 forming the color filter substrate 2. In the second exemplary embodiment, a polarizing plate with NAZ film Nz=0.3, Δnd=180 nm manufactured by Nitto Denko Corporation is used as the two-axis phase difference film 55 and the lower-side polarizing plate 53, and the two-axis phase difference film 56 and the upper-side polarizing plate 54. Needless to say, it is not limited to this, but other two-axis phase difference films may be preferably used.

The light leakage due to the alignment defect near the source line 12 is the dominant factor of the black luminance from the oblique direction, which gives an adverse effect. Thus, the correlation of the contrast and the distance D1 of the eaves 43 of the black matrix 42 is examined also for the black luminance of the oblique direction view.

Figure 15:
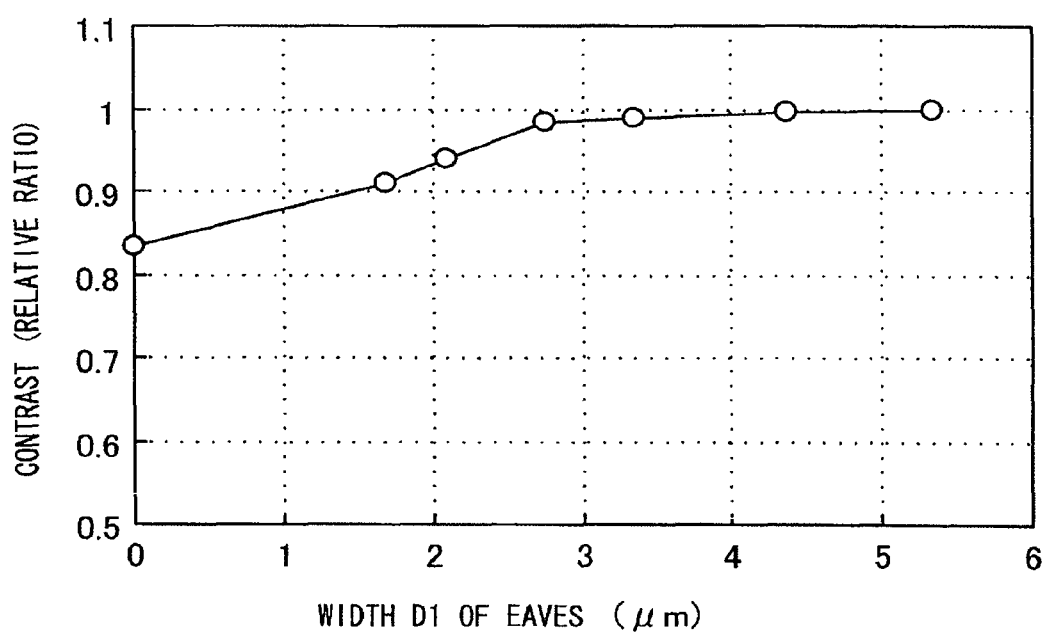
FIG. 15 is a graph in which contrast from a viewing direction of an azimuth angle of 45° and a polar angle of 45° is plotted with respect to a distance D1 in the liquid crystal display panel according to the second exemplary embodiment.

FIG. 15 shows a graph in which the relative contrast from a viewing direction of the azimuth angle of 45°, polar angle of 45° is plotted with respect to the distance D1 in the liquid crystal display device of the second exemplary embodiment. As a result, it is confirmed that the contrast in the direction of the oblique view can be improved by adding the two-axis phase difference films 55 and 56 and providing the eaves 43 of the black matrix 42. Further, it is turned out that the contrast in the oblique direction can be improved with more efficiency by setting the distance D1 as 2.5 µm or larger.

According to the second exemplary embodiment, it is possible to achieve the improvement of the contrast not only in the frontal direction but also in the oblique direction by adding the two-axis phase difference film between the polarizing plate and the liquid crystal.

Described in the second exemplary embodiment is the example in which two two-axis phase difference films are provided. However, the similar effect as that described above can be obtained also by providing the two-axis phase difference film only in one of the upper-side polarizing plate 54 and the lower-side polarizing plate 53.

Third Exemplary Embodiment

A basic structure of a liquid crystal display device according to a third exemplary embodiment is similar to that of the first exemplary embodiment except the following point. The third exemplary embodiment differs from the first exemplary embodiment in that source lines and a transparent common electrode are made in a linear shape.

Figure 16:
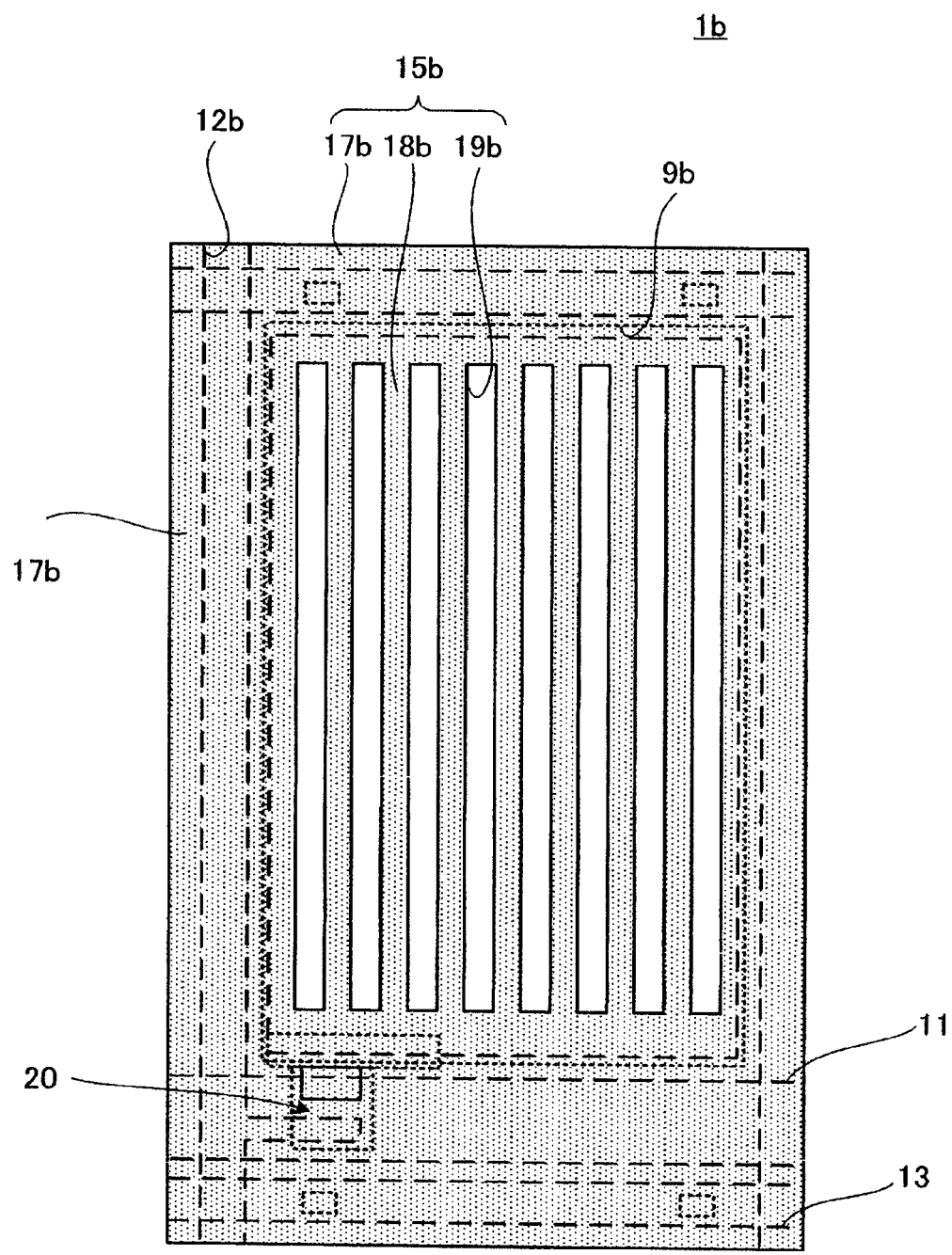
FIG. 16 is an enlarged schematic plane view showing a main part of a display area of an array substrate according to a third exemplary embodiment.

FIG. 16 shows a schematic plane view of a main part of an array substrate 1b of the liquid crystal display device according to the third exemplary embodiment. The array substrate 1b includes a source line 12b that is formed in a linear shape. Further, as is similar to the source line 12b, a transparent common electrode 15b includes branch-like electrode parts 18b and gap parts 19b which are made in a linear shape.

It is considered that the reason why the light leakage occurs due to the alignment defect of the liquid crystal 50 beside the source line 12b is that, since the step of the source line 12b is typically 0.1 μm or larger, the defect of the alignment film easily occurs in the area. The defect of the alignment film 61 is considered to occur since the rubbing cloth rolled in the rubbing roller cannot rub the step part in the similar way as in other areas due to the step of the source line 12b, and the liquid crystal cannot be aligned in a desired direction. As a result, the alignment defect easily occurs and the black luminance tends to increase in the liquid crystal beside the source line 12.

According to the third exemplary embodiment, the same effect as that in the first exemplary embodiment can be obtained. In particular, when the step of the source line is large, the condition at the time of rubbing is different between the neighborhood of the step structure and other areas, which easily causes the alignment defect of the liquid crystal. The present invention is particularly effective in such a structure.

Note that the liquid crystal display panel and the liquid crystal display device according to the present invention are not limited to the exemplary embodiments described above, but may be changed as appropriate without departing from the spirit of the present invention. Furthermore, the above first exemplary embodiment to the third exemplary embodiment may be suitably combined.

Described in the exemplary embodiments above is an example of providing the transparent common electrode and the black matrix on the source lines. However, it is not limited to the source line. A transparent common electrode and a black matrix having the following structures can be applied to the conductive pattern in the display area 3 in which the light leakage occurs due to the alignment defect of the liquid crystal. Specifically, a light-shielding layer provided to overlap with the conductive pattern in a planar view and including eaves protruding compared with the conductive pattern may be formed. The transparent common electrode may be arranged to cover the conductive pattern and to protrude compared to the light-shielding layer. By applying these structures, the similar effect as that in the exemplary embodiments above can be obtained. The conductive pattern includes, for example, a gate line, a common line, and a TFT.

When the gate lines are arranged above the source lines (e.g., top-gate type), the transparent common electrode and the black matrix as described above are arranged on the gate lines, thereby achieving the similar effect as that in the exemplary embodiments described above.

The transparent common electrode which is the comb-tooth electrode may at least have a gap part and a branch-like electrode part, and it may have any shape. The shape of the source line and the gate line is merely an example, and various other shapes may be used.

Further, although described above is the example of rubbing the alignment film, the present invention is not limited to the alignment processing method by the rubbing processing but the alignment processing may be performed by other processing like a photo-alignment method. Further, the transparent conductive film is not limited to ITO, IZO, and various materials can be used.

Although the example of the black matrix has been described as the light-shielding layer, other materials may be used without departing from the spirit of the present invention as long as it has a light-shielding function. A parallax barrier or the like may be used as the light-shielding layer. Further, the arrangement of the light-shielding layer is not particularly limited. For example, the light-shielding layer may be provided on the external principal surface of the color filter substrate or may be provided on the side of the array substrate.

From the invention thus described, it will be obvious that the exemplary embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display panel comprising:
   a first substrate;
   a second substrate; and
   liquid crystal sealed between the first substrate and the second substrate, wherein
   the first substrate includes:
      a gate line,
      a source line that is formed to cross the gate line,
      a switching element that is arranged near an intersection of the gate line with the source line,
      a transparent pixel electrode that is connected to the switching element,
      a transparent common electrode that includes a first step portion and a second step portion respectively arranged adjacent to opposite ends of the source line in a cross-sectional view, the transparent common electrode overlapping the transparent pixel electrode with an insulating film interposed therebetween, and
      a shading layer, which is not the gate line, that overlaps at least one of part of the source line, the source line overlapping the transparent common electrode,
   in a plane view, the shading layer includes a first eave and a second eave protruding from respective opposite sides of the source line by a first distance, and
   in the cross-sectional view, the shading layer is arranged over portions of the transparent common electrode that are at a same level as and adjacent to respective lower portions of the first and second step portions of the transparent common electrode.

2. The liquid crystal display panel according to claim 1, wherein
   the transparent common electrode includes at least electrode parts in the form of a branch and gap parts between the electrode parts.

3. The liquid crystal display panel according to claim 1, wherein
   a fringe electric field is applied between the transparent common electrode and the transparent pixel electrode.

4. The liquid crystal display panel according to claim 1, wherein the first distance associated with each of the first and second eaves is 3.0 μm or larger.

5. The liquid crystal display panel according to claim 1, wherein the transparent common electrode protrudes from both end parts in a width direction of the shading layer by 2.5 µm or larger.

6. The liquid crystal display panel according to claim 1, wherein
a first polarizing plate including a polarizer is arranged in an external principal surface of the first substrate,
a second polarizing plate including a polarizer is arranged in an external principal surface of the second substrate, and
a two-axis phase difference film is arranged in at least one of an area between the polarizer of the first polarizing plate and the liquid crystal and an area between the polarizer of the second polarizing plate and the liquid crystal.

7. The liquid crystal display panel according to claim 2, wherein
the source line, the electrode parts, and the gap parts of the transparent common electrode each have a bending structure.

8. The liquid crystal display panel according to claim 1, wherein the shading layer is a black matrix formed in the second substrate.

9. The liquid crystal display panel according to claim 1, wherein
in the plane view, the first step portion and the second step portion are arranged along a direction where the source line extends.

10. A liquid crystal display device on which the liquid crystal display panel according to claim 1 is mounted.

11. A liquid crystal display panel comprising:
a first substrate;
a second substrate; and
liquid crystal sealed between the first substrate and the second substrate, wherein
the first substrate includes:
a gate line,
a source line that is formed to cross the gate line,
a switching element that is arranged near an intersection of the gate line with the source line,
a transparent pixel electrode that is connected to the switching element,
a transparent common electrode that includes a step portion arranged adjacent to an end of the common line in a cross-sectional view, the transparent common electrode overlapping the transparent pixel electrode with an insulating film interposed therebetween,
a common line that supplies a potential to the transparent common electrode and overlaps the transparent common electrode, and
a shading layer, which is not the source line, that overlaps at least one of part of the common line,
in a plane view, the shading layer includes an eave protruding by a first distance from a side of the common line, and
in the cross-sectional view, the shading layer is arranged over a portion of the transparent common electrode that is at a same level as and adjacent to a lower portion of the step portion of the transparent common electrode.

12. The liquid crystal display panel according to claim 11, wherein
the transparent common electrode includes at least electrode parts in the form of a branch and gap parts between the electrode parts, and
the source line, the electrode parts, and the gap parts of the transparent common electrode each have a bending structure.

13. The liquid crystal display panel according to claim 11, wherein the shading layer is a black matrix formed in the second substrate.

14. The liquid crystal display panel according to claim 11, wherein
in the plane view, the step portion is arranged along a direction where the common line extends.

15. A liquid crystal display device on which the liquid crystal display panel according to claim 11 is mounted.

16. A liquid crystal display panel comprising:
a first substrate;
a second substrate; and
liquid crystal sealed between the first substrate and the second substrate,
wherein the first substrate includes:
a gate line,
a source line that is formed to cross the gate line,
a switching element that is arranged near an intersection of the gate line with the source line,
a transparent pixel electrode that is connected to the switching element,
a transparent common electrode that overlaps the transparent pixel electrode with an insulating film interposed therebetween, and includes a step portion arranged adjacent to an end of a non-permeable conductive layer, and
a shading layer that overlaps at least one of part of the non-permeable conductive layer, the non-permeable conductive layer overlapping the transparent common electrode, in a cross-sectional view,
in a plane view, another non-permeable conductive layer is provided, but both non-permeable conductive layers are not provided in a lower layer below a lower portion of the step portion of the transparent common electrode overlapping an eave of the shading layer that protrudes from a side of the non-permeable conductive layer, and
in the cross-sectional view, the shading layer is arranged over a portion of the transparent common electrode that is at a same level as and adjacent to the lower portion of the step portion of the transparent common electrode.

17. The liquid crystal display panel according to claim 16, wherein
the transparent common electrode includes at least electrode parts in the form of a branch and gap parts between the electrode parts, and
the source line, the electrode parts, and the gap parts of the common transparent electrode each have a bending structure.

18. The liquid crystal display panel according to claim 16, wherein
the shading layer is a black matrix formed in the second substrate.

19. The liquid crystal display panel according to claim 16, wherein
in the plane view, the step portion is arranged along a direction where the non-permeable conductive layer extends.

20. The liquid crystal display panel according to claim 16, wherein
the non-permeable conductive layer is at least one of the source line and the gate line.

21. A liquid crystal display device on which the liquid crystal display panel according to claim 16 is mounted.

* * * * *